(12) United States Patent
Finkowski

(10) Patent No.: US 8,679,565 B2
(45) Date of Patent: Mar. 25, 2014

(54) SYSTEM AND APPARATUS FOR REMOVING TRIM FROM DOUGH PRODUCTS

(75) Inventor: James W. Finkowski, Andover, MN (US)

(73) Assignee: General Mills, Inc., Minneapolis, MN (US)

(*) Notice: Subject to any disclaimer, the term of this patent is extended or adjusted under 35 U.S.C. 154(b) by 528 days.

(21) Appl. No.: 12/859,902

(22) Filed: Aug. 20, 2010

(65) Prior Publication Data

US 2010/0320060 A1 Dec. 23, 2010

Related U.S. Application Data

(62) Division of application No. 11/956,732, filed on Dec. 14, 2007, now Pat. No. 7,806,678.

(51) Int. Cl.
B65G 45/18 (2006.01)
(52) U.S. Cl.
USPC ........... 426/518; 426/479; 426/503; 425/215; 425/216; 425/312; 425/315; 198/459.7
(58) Field of Classification Search
CPC ................................ A21C 11/10; A21C 11/12
USPC ................ 426/496, 502, 503, 517, 518, 479; 425/215, 216, 217, 311, 312, 313, 315; 198/459.6, 459.7
See application file for complete search history.

(56) References Cited

U.S. PATENT DOCUMENTS

| 1,535,544 | A | | 4/1925 | Reese | |
|---|---|---|---|---|---|
| 1,741,722 | A | * | 12/1929 | Kremmling | 426/302 |
| 1,747,954 | A | * | 2/1930 | Rydberg | 83/862 |
| 2,127,651 | A | * | 8/1938 | Panther | 83/588 |
| 2,160,783 | A | * | 5/1939 | McDonald | 425/293 |
| 2,195,346 | A | * | 3/1940 | Verheij | 425/373 |
| 2,454,316 | A | * | 11/1948 | Haecks | 83/102 |
| 2,524,928 | A | | 10/1950 | Platz | |
| 2,843,983 | A | * | 7/1958 | Archer | 53/74 |
| 3,055,318 | A | * | 9/1962 | Engels | 425/182 |
| 3,139,975 | A | | 7/1964 | Schaefer | |
| 3,188,688 | A | | 6/1965 | Rieth | |
| 3,274,956 | A | * | 9/1966 | Francia et al. | 425/216 |
| 3,335,678 | A | | 8/1967 | Katz | |
| 3,508,458 | A | | 4/1970 | Cunningham | |
| 3,766,850 | A | | 10/1973 | Silverberg | |
| 3,932,947 | A | | 1/1976 | Smoot | |
| 3,933,068 | A | | 1/1976 | Rejsa | |
| 4,106,400 | A | * | 8/1978 | Noel | 99/373 |
| 4,173,127 | A | | 11/1979 | Sandberg | |
| 4,321,023 | A | * | 3/1982 | Rexroth | 425/66 |
| 4,449,958 | A | | 5/1984 | Conrad | |
| 4,650,060 | A | | 3/1987 | Storimans | |
| 4,687,431 | A | | 8/1987 | Stengelin | |
| 4,831,925 | A | | 5/1989 | Zanetti | |
| 5,009,910 | A | * | 4/1991 | Zwicker | 426/499 |
| 5,354,571 | A | * | 10/1994 | Morikawa et al. | 426/496 |

(Continued)

Primary Examiner — Seyed Masoud Malekzadeh

(74) Attorney, Agent, or Firm — John L. Crimmins; Everett G. Diederiks, Jr.

(57) ABSTRACT

A system for removing trim from sheet dough including a belt defined by an upper edge, lower edge, an interior surface, and an exterior surface, wherein a plurality of brushes extend from the lower edge of the belt at an orientation substantially perpendicular to the lower edge, an idler sprocket in communication with the interior surface of the belt, and a motor configured to rotate the belt about the idler sprocket.

11 Claims, 5 Drawing Sheets

(56) References Cited

U.S. PATENT DOCUMENTS

| | | |
|---|---|---|
| 5,400,897 A | 3/1995 | Doyle |
| 5,577,410 A * | 11/1996 | Willard et al. .................. 73/169 |
| 5,649,616 A | 7/1997 | Stecklow |
| 5,890,579 A | 4/1999 | Young |
| 5,979,011 A | 11/1999 | Miyawaki et al. |
| 6,203,002 B1 | 3/2001 | Ference |
| 6,524,090 B1 * | 2/2003 | Hayashi et al. ................ 425/140 |
| 6,601,692 B2 | 8/2003 | Schaefer et al. |
| 6,964,331 B1 | 11/2005 | Kerr |
| 2006/0150581 A1 * | 7/2006 | Wardle et al. .................. 53/428 |
| 2007/0151062 A1 * | 7/2007 | Mehlhorn ....................... 15/186 |

* cited by examiner

SYSTEM AND APPARATUS FOR REMOVING TRIM FROM DOUGH PRODUCTS

CROSS REFERENCE TO RELATED APPLICATIONS

This application is a Divisional of U.S. patent application Ser. No. 11/956,732, filed on Dec. 14, 2007, now U.S. Pat. No. 7,806,678, the entire disclosure of which is incorporated herein by reference.

FIELD OF THE INVENTION

The present invention relates to apparatus and methods for fabricating packaged food products such as dough products. In particular, the present invention relates to a device and method useful for removing trim from raw dough products to create a straight and uniform product before packaging.

BACKGROUND OF THE INVENTION

Many consumers enjoy the convenience of packaged food products such as dough products. In particular, raw dough products have gained commercial success as provided in frozen or refrigerated forms to enable consumers to make home-baked dough products. Such raw dough products are typically packaged in formats to facilitate consumer use, as desired. Potential consumers of such refrigerated or frozen dough products include individual in-home consumers, as well as in-store bakeries and restaurants that bake rolls or cookies on-site and sell the products to customers at the bakery or restaurant.

Many dough products suitable for packaging as frozen or refrigerated products have been developed. For example, biscuits or breadsticks are frequently packaged in refrigerated or frozen forms, using a package that contains multiple portions in a spiral-wound can. In this format, the can must be opened, and the multiple products removed and prepared by the consumer.

One processing format for dough used to form biscuits or breadsticks is sheeting. Such sheeted dough is typically more suitable for high-speed processes of manufacturing. Generally, sheeted dough possesses adequate cohesiveness to hold together during conveying, yet yields clean separations of the individual dough pieces as the various pieces are cut by a conventional apparatus.

One known method for making sheeted dough on a mass production basis utilizes a conveyor. According to this process, appropriately formulated dough is fed from a hopper downwardly through a sheeting system, or series of rolling devices, which reduces the thickness of the dough sheet to less than 10 mm. As the dough leaves the rolling devices, it is then transferred onto the conveyor. Next, the dough is formed into a flat sheet with the potential for making multiple lanes of product. The dough can then be cut into strips using conventional means. The shape of the dough is then further manipulated, and collected into groups of multiple products for subsequent packaging and storage in refrigerated or frozen environments. These high-speed methods for sheeted dough typically produce thousands of products a minute, depending on the rate of manufacture.

When transported on the conveyor, the portions of the dough at the outer edges of the sheet are typically rough, or otherwise uneven. Before subsequent processing, it is desirable to create straight or uniform edges on the sides of the stream of dough. Accordingly, this edge portion must be removed to create a uniform and aesthetically pleasing product before it is packaged. If not trimmed or removed, the outside lane of product would be malformed and unacceptable to the consumer.

A variety of methods have been used to remove trim from the edge of the stream of dough as the dough travels on the conveyor. Manual removal by a production line operator yields a desirable result in terms of accuracy and integrity of the remaining dough product. However, manual removal is generally not feasible in high speed manufacturing processes that are practiced on a plant scale.

Mechanical devices that have been used to remove trim from a dough stream are shown in FIGS. 1 and 2. In FIG. 1, a prior art mechanical device in the form of a stationary plow 2 is positioned downstream from the cutting wheel 4. As the dough stream moves along the conveyor 28, the trim 36 is separated from the main stream of dough when the cutting wheel 4 passes over the dough. As the trim 36 continues to move along the conveyor 28, it contacts the plow 2. The plow 2 forces the trim 36 to move in a direction away from the main stream of dough, and eventually off the conveyor 28.

An alternative prior art mechanical device for removing trim 36 from a dough stream is shown in FIG. 2. In this embodiment, a rotary brush 6 and motor 8 are positioned downstream from the cutting wheel. The rotary brush 6 is defined by a circular disk with bristles on the entire under-surface of the disk. The motor 8 is positioned directly above the brush 6, and is configured to rotate the brush 6 about the axis of the motor's drive-shaft. During production, the motor 8 continuously rotates the brush 6. As the dough stream moves along the conveyor, the trim 36 is separated from the main stream of dough when the cutting wheel passes over the dough. As the trim 36 continues to move along the conveyor, it comes into contact with the rotating brush 6. The rotation of the brush 6 in the desired direction causes the trim 36 to move in a direction away from the main stream of dough, and eventually off the conveyor.

The devices shown in FIGS. 1 and 2 have a wide variety of shortcomings. For example, the stationary plow 2 is only able to move the trim a short distance. If the length of the plow 2 is increased with the intention of moving the trim 36 a longer distance, the frictional force of the trim 36 against the plow 2 is increased, often causing the trim 36 to bunch up, or twist onto the main dough stream.

The rotary brush is also incapable of moving the trim large distances because the diameter of the rotating brush serves as a functional limitation. Furthermore, neither the plow nor the rotary brush devices are very reliable or consistent at "self-starting" the trim from the belt. For example, when a new dough stream, or previously broken dough stream moves down the conveyor, dough will often ball-up on the plow or ride over the top of the rotary brush. Moreover, a further drawback of the rotary brush embodiment is the drive motor that is generally located above the brush and over the product zone. In this configuration, additional care must be taken to avoid the possibility of machine particles or lubricants contacting the dough stream.

In addition to the shortcomings discussed above, the alignments of mechanical removal devices are especially difficult when manufacturing sheet dough on a large scale. For example, the act of contacting a dough stream with a mechanical apparatus can alter the dough stream by inappropriately picking up the dough stream, deforming the dough stream, or moving the dough stream to an undesired location. These problems can be exacerbated at the high speeds of modern production processes described above.

SUMMARY OF THE INVENTION

The apparatuses and methods according to the various embodiments of the present invention remove uneven trim efficiently from a food-product stream without causing damage to the dough product. The invention specifically includes a system for removing trim from sheet dough. The system comprises a belt defined by an upper edge, lower edge, an interior surface, and an exterior surface. A plurality of brushes extend from the lower edge of the belt at an orientation substantially perpendicular to the lower edge. An idler sprocket is in communication with the interior surface of the belt, and a motor is configured to rotate the belt. The motion of the belt causes the plurality of brushes adjacent to the idler sprocket to contact the trim and sweep it away from the food product. In a preferred embodiment, the motor is positioned adjacent to the conveyor, such that machine particles and lubricants cannot drop from the motor onto the conveyor.

In an alternative embodiment, the invention includes a device for removing trim from sheet dough. The device comprises a belt defined by an upper edge and a lower edge. A plurality of brushes extend from the lower edge of the belt at an orientation substantially perpendicular to the lower edge.

In yet another alternative embodiment, the invention includes a method of removing trim from a food product stream. The method comprises the steps of providing a system having a belt defined by an upper edge, lower edge, an interior surface, and an exterior surface. A plurality of brushes extend from the lower edge of the belt at an orientation substantially perpendicular to the lower edge. The belt is rotated about an idler sprocket to sweep trim away from the food product stream.

BRIEF DESCRIPTION OF THE DRAWINGS

The embodiments of the present invention may be more completely understood in consideration of the following detailed description of various embodiments of the invention in connection with the accompanying drawings, in which.

Figure 1:
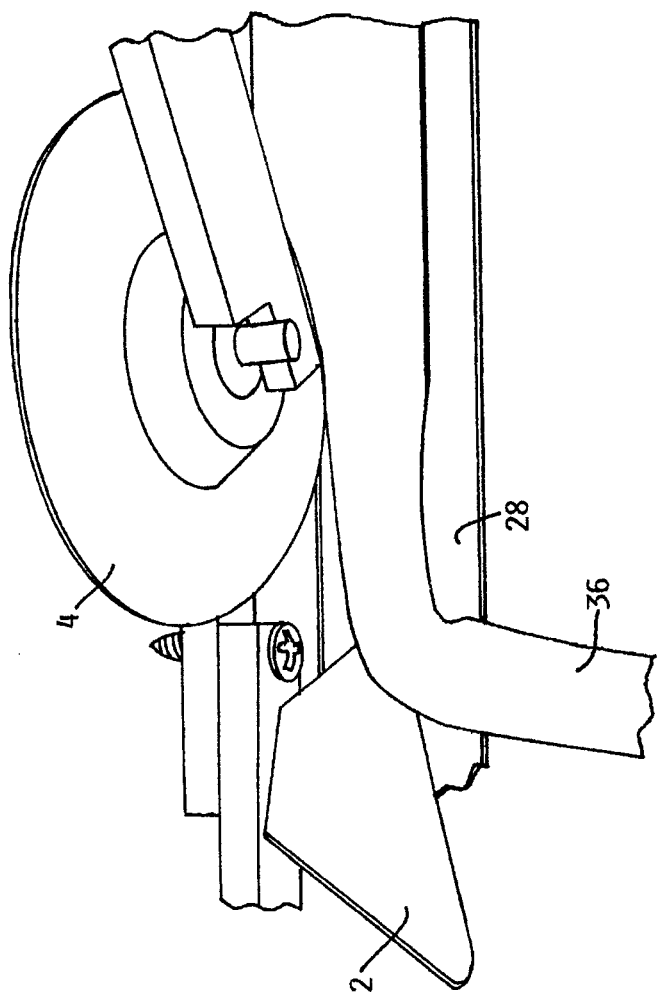
FIG. 1 is an isometric view of a prior art mechanical trim removal system.
Figure 2:
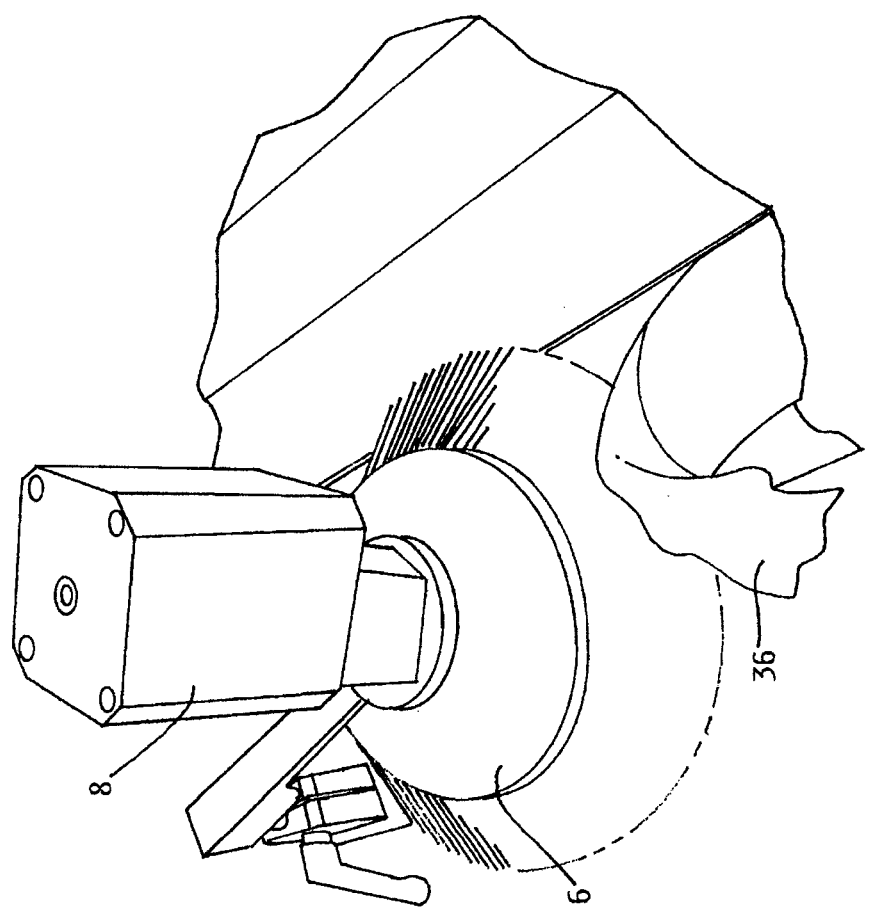
FIG. 2 is an isometric view of an alternative embodiment of a prior art mechanical trim removal system.

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE EMBODIMENTS

Figure 3:
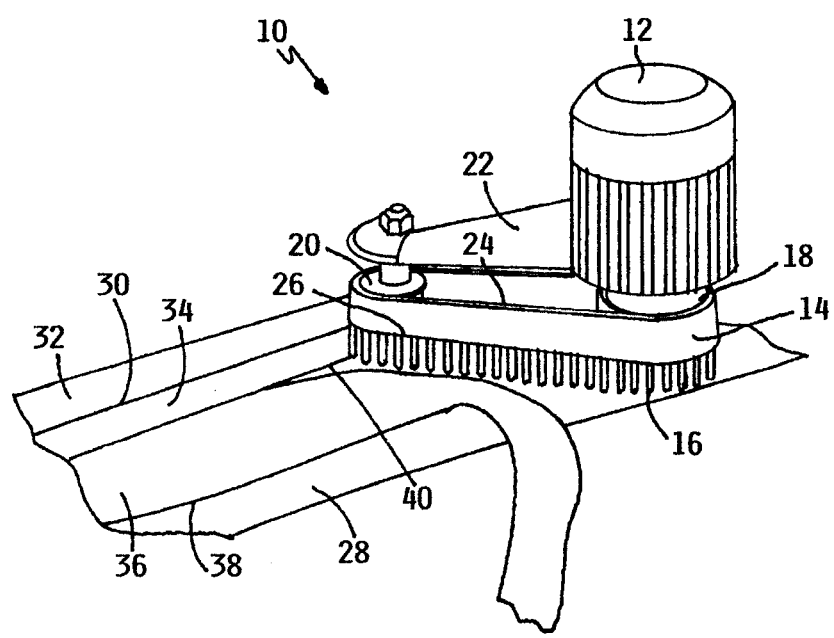
FIG. 3 is an isometric view of the trim removal system according to an embodiment of the present invention.

The system of the present invention can be used for a wide variety of sheeted dough products. Accordingly, the present invention is described by way of example in connection with, but not limited to, the system 10, as shown in FIG. 3. It should be understood that system 10 of the present invention is not in any way limited to such use and can be applied to a variety of other applications for food preparation.

Referring to FIG. 3, system 10 according to an embodiment of the present invention generally includes motor 12, belt 14, and brushes 16. Sprocket 18 is coupled to motor 12 such that sprocket 18 rotates when a rotational force is applied by motor 12. Idler sprocket 20 is coupled to motor 12 by arm 22. In a preferred embodiment, motor 12 includes a variable-speed motor capable of delivering up to 1800 rpm. However a wide variety of motors can be used while remaining within the scope of the invention.

Belt 14 is disposed about sprocket 18 and sprocket 20. Belt 14 includes upper edge 24 proximate to motor 12 and lower edge 26 on the side of belt 14 away from motor 12. This configuration enables belt 14 to rotate about sprockets 18 and 20 when a force is applied by motor 12. A plurality of brushes 16 extend from lower edge 26 of belt 14. In a preferred embodiment, the plurality of brushes 16 are substantially perpendicular to lower edge 26.

In a preferred embodiment, belt 14 includes a timing belt. However, in alternative embodiments, belt 14 can also include a wide range of power transmission components including "V" belts, chains, narrow conveyor belts, or plastic belts, each with a plurality of brushes 16 that extend from such belts or chains in a substantially perpendicular direction.

System 10 is preferably disposed over conveyor 28. During the manufacturing process, food product 30 travels on conveyor 28 in a direction toward system 10. Food product 30 is cut into strips 32 and 34. Food product 30 also includes trim 36. Trim 36 includes uneven edge 38. It is desirable for trim 36 to be removed from the conveyor 28 because uneven edge 38 can create irregularities in the final product.

In operation, motor 12 turns sprocket 18 in a counter-clockwise direction with respect to FIG. 3. This, in turn, causes belt 14 to rotate in a generally counterclockwise direction. As product 30 approaches system 10, the plurality of brushes 16 adjacent to sprocket 20 contact product 30 between strip 34 and trim 36. The rotation of belt 14 causes brushes 16 to pull trim 36 off conveyor 28 while leaving a straight edge 40 for further processing or packaging.

In a preferred embodiment, sprocket 20 includes a relatively small radius to create a more effective "sweeping" motion to effectively pull trim 36 away from the remaining product 30. In one embodiment, the radius of sprocket 20 is less than 4 inches (10.16 cm). In yet another embodiment, the radius of sprocket 20 is less than 2 inches (5.08 cm).

Figure 4:
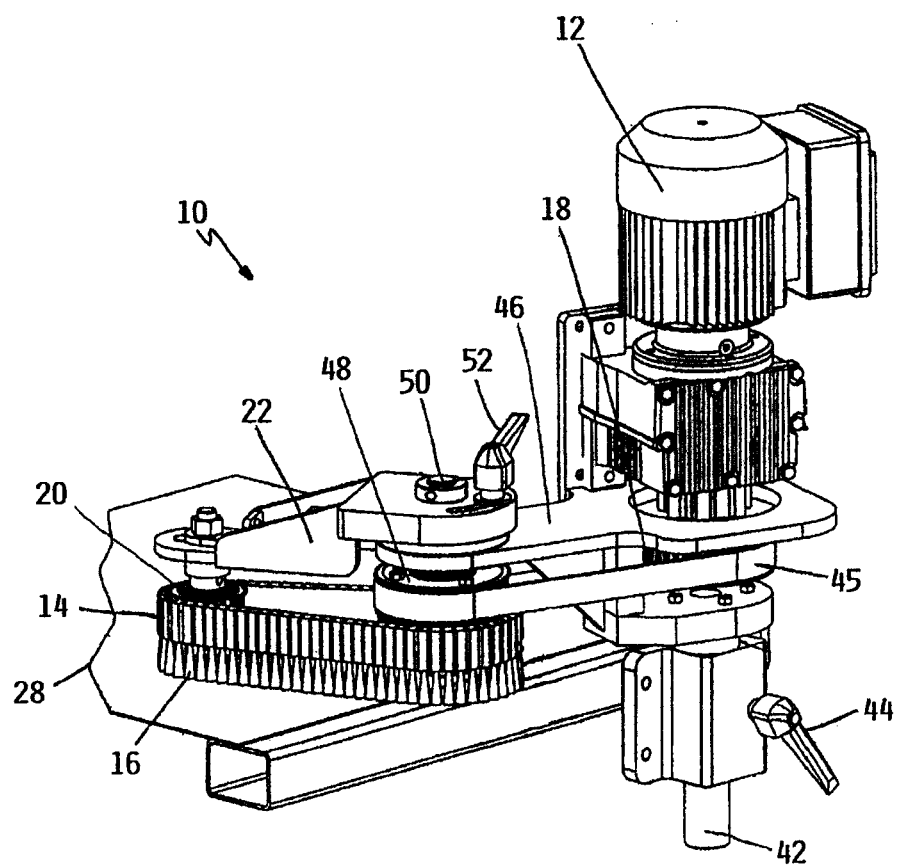
FIG. 4 is an isometric view of the trim removal system according to an alternative embodiment of the present invention.

With reference to FIG. 4, an alternative embodiment of system 10 will now be discussed. System 10 is mounted on shaft 42. Shaft 42 is generally comprised of a stainless steel shaft collar that is one inch in diameter. However, a variety of shafts can be used while remaining within the scope of the invention.

System 10 is vertically adjustable with respect to shaft 42 using handle 44. Handle 44 can be loosened to move system 10 along shaft 42 until brushes 16 contact conveyor. Once the desired vertical adjustment is achieved, handle 44 is tightened to secure the position of system 10 with the force of friction.

System 10 includes frame 46 to position belt 14 at a distance away from motor 12. This configuration is desirable orient motor 12 adjacent to conveyor 28 to keep machine particles and lubricants from falling onto conveyor 28. Motor 12 is mounted to frame 46 in a vertical orientation. In a preferred embodiment, motor 12 is comprised of a ½ hp electric motor capable of operating at about 180 revolutions per minute. However, a wide variety of motors may be used while remaining within the scope of the invention.

The rotational force of motor 12 is transferred to belt 14 through drive belt 45. In this embodiment, drive belt 45 is disposed about sprocket 18 such that the operation of motor 12 causes sprocket 18 to rotate. The rotational force of drive belt 45 is transferred to belt 14 at hub 48. Hub 48 is mounted to frame 46 by shaft 50. Arm 22 is pivotally coupled to frame 46 by shaft 50.

Belt 14 is disposed about idler sprocket 20 and hub 48. In a preferred embodiment, the position of arm 22 can be adjusted with respect to frame 46 using handle 52. This enables an operator to position sprocket 20 at a desired location so that the plurality of brushes 16 will be in an optimal position to remove trim 36 from product 30. When arm 22 is in a desired position, the user can tighten handle 52 so that the force of friction will prevent arm 22 from pivoting with respect to frame 46.

Figure 5:
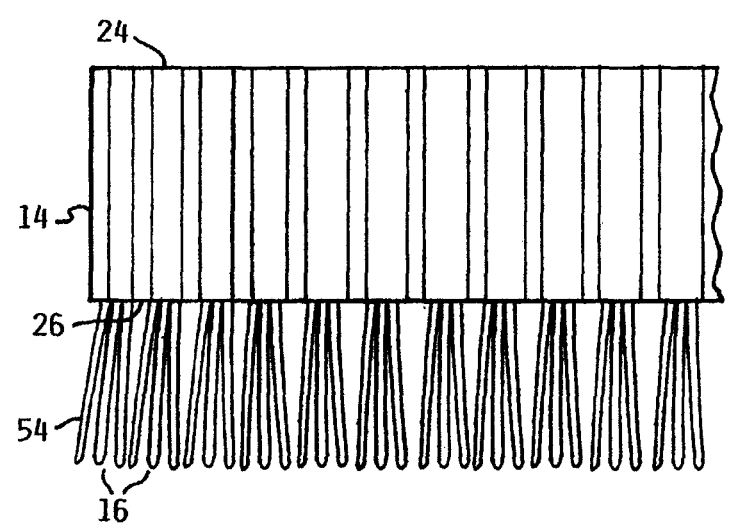
FIG. 5 is a front view of a belt according to the present invention.

With reference to FIG. 5, additional detail of belt 14 is shown. In one embodiment, belt 14 is comprised of urethane. In a preferred embodiment, belt 14 is comprised of reinforced urethane to provide additional strength and wear-resistance.

Belt 14 includes upper edge 24, and lower edge 26. A plurality of brushes 16 are attached to lower edge 26 of belt 14 in an orientation that is substantially perpendicular to lower edge 26. In one embodiment, multiple brushes 16 are disposed along the length of belt 14.

Brushes 16 are comprised of individual bristles 54. Bristles 54 are generally comprised of nylon, although a variety of materials may be used while remaining within the scope of the invention. In a preferred embodiment, bristles 54 are stiff and fine enough so they will gently sweep the trim 36 off the conveyor in a controlled manner, without causing damage to the dough product.

Bristles 54 can be defined by a wide variety of lengths while remaining within the scope of the invention. In one embodiment, bristles 54 are between 1 inch and 6 inches long (2.54 cm to 15.24 cm). In a preferred embodiment, bristles 54 are between 2 inches and 4 inches long (5.08 cm to 10.16 cm).

The embodiments above are intended to be illustrative and not limiting. Additional embodiments are within the claims. In addition, although the present invention has been described with reference to particular embodiments, those skilled in the art will appreciate that changes can be made in form and detail without departing from the spirit and scope. Any incorporation by reference of documents above is limited such that no subject matter is incorporated contrary to the explicit disclosure herein.

What is claimed:

1. A method of removing a trim from a food product stream which travels along on a conveyor and has been cut to establish the food product stream trim, the method comprising the steps of:
    providing a system including;
        a belt defined by an interior side having an interior surface, an exterior side having an exterior surface, an upper edge extending between the interior and exterior surfaces, and a lower edge extending between the interior and exterior surfaces, wherein a plurality of brushes extend from the lower edge of the belt at an orientation substantially perpendicular to the lower edge;
    rotating the belt about an idler sprocket defined by a radius of less than 4 inches (10.16 cm) wherein a motion of the belt causes the plurality of brushes to contact the food product stream trim to sweep the trim away from the food product stream while not damaging edges of the food product stream and avoiding formation of irregularities in the food product stream caused by an uneven edge of the trim.

2. The method of claim 1, further comprising the step of: delivering the food product stream to the system on the conveyor.

3. The method of claim 2, further comprising the step of: recycling the trim back to the food product stream.

4. A method for removing a trim from a sheet dough which travels along on a conveyor and has been cut to establish a food product stream and the trim comprising:
    operating a motor to cause a belt, defined by an interior side having an interior surface, an exterior side having an exterior surface, an upper edge extending between the interior and exterior surfaces, a lower edge extending between the interior and exterior surfaces, and a plurality of brushes extending substantially perpendicular from the lower edge of the belt, to rotate; and
    engaging the plurality of brushes with the trim to remove the trim from the sheet dough, wherein a motion of the belt causes the plurality of brushes to contact the trim to move the trim away from the food product stream while not damaging edges of the food product stream and avoiding formation of irregularities in the food product stream caused by an uneven edge of the trim.

5. The method of claim 4, further comprising: recycling the trim back to the food product stream.

6. The method of claim 4, further comprising: directing the belt about an idler sprocket in communication with the interior surface of the belt, wherein the idler sprocket is defined by a radius that is less than 4 inches (10.16 cm).

7. The method of claim 6, further comprising: rotating the idler sprocket about an arm having a first end and a second end, wherein the idler sprocket is rotatably coupled to the second end of the arm.

8. The method of claim 7, further comprising: pivoting the first end of the arm relative to a frame in order to move the idler sprocket with respect to the conveyor.

9. The method of claim 4, further comprising: transferring a rotational force from the motor to the interior of the belt.

10. The method of claim 4, further comprising: vertically adjusting the belt with respect to the conveyor.

11. In a food preparation system, a method of removing a trim from a sheet dough comprising:
    conveying the sheet dough over a conveyor which has been cut to establish a food product stream and the trim; and
    engaging the trim of the conveyed food product stream with a plurality of brushes extending at an orientation substantially perpendicular to a lower edge of a belt, between an interior surface and an exterior surface of the belt, wherein a motion of the belt causes the plurality of brushes to contact the trim to remove the trim from the sheet dough while not damaging edges of the food product stream and avoiding formation of irregularities in the food product stream caused by an uneven edge of the trim.

* * * * *